United States Patent [19]
Bednar et al.

[11] Patent Number: 5,242,699
[45] Date of Patent: Sep. 7, 1993

[54] PROCESS FOR PREPARING MICROWAVABLE FRENCH FRIED POTATOES

[75] Inventors: Rebecca Bednar, Cudahy; Kirk L. Parkin; Joachim von Elbe, both of Madison, all of Wis.

[73] Assignee: Nothern Star Co., Minneapolis, Minn.

[21] Appl. No.: 935,058

[22] Filed: Aug. 24, 1992

[51] Int. Cl.$^5$ ............................................. A23L 1/217
[52] U.S. Cl. .................................. 426/302; 426/102; 426/438; 426/441; 426/637
[58] Field of Search ............... 426/102, 302, 438, 637, 426/441, 241

[56] References Cited

U.S. PATENT DOCUMENTS

| | | |
|---|---|---|
| 3,085,020 | 4/1963 | Backinger et al. ............. 426/438 X |
| 3,424,591 | 1/1969 | Gold. | 
| 3,597,227 | 8/1971 | Murray et al. ................... 426/102 |
| 4,109,020 | 8/1978 | Gorfien et al. ................... 426/241 |
| 4,551,340 | 11/1985 | El-Hag et al. ................... 426/438 |
| 4,590,080 | 5/1986 | Pinegar .............................. 426/441 |
| 4,900,573 | 2/1990 | Meyers et al. ................. 426/438 X |
| 4,900,576 | 2/1990 | Bonnett et al. ................... 426/438 |
| 4,931,296 | 6/1990 | Shanbhag et al. ............... 426/243 |
| 5,059,435 | 10/1991 | Sloan et al. ..................... 426/441 X |

FOREIGN PATENT DOCUMENTS 0487340 5/1992 European Pat. Off. ............. 426/302

OTHER PUBLICATIONS

"A Comparison of Chemical and Physical Methods for Treating French Fries to Produce an Acceptable Microwaved Product", Alfred A. Bushway et al.; American Potato Journal; vol. 61, pp. 31–40.

*Primary Examiner*—Arthur L. Corbin
*Attorney, Agent, or Firm*—Palmatier, Sjoquist & Helget

[57] ABSTRACT

A process, and product thereof, for preparing French fried potatoes for heating in a microwave oven without suscepters. The process includes the steps of 1) cleaning, peeling, slicing, and sizing the potatoes; then 2) blanching the potatoes to affect a partial cook and preserve color stability; then 3) deep frying the potatoes in oil to further partially cook the potatoes; then 4) applying a cellulose derivative coat to the potatoes; then 5) at least partially drying the potatoes to at least partially fix the cellulose derivative coat; and then 6) deep frying the potatoes to further fix the cellulose derivative coat for frozen storage and subsequent reheating in the microwave oven. The preferred cellulose derivative is methylcellulose.

12 Claims, 1 Drawing Sheet

PROCESS FOR PREPARING MICROWAVABLE FRENCH FRIED POTATOES

BACKGROUND OF THE INVENTION

French fried potatoes are conventionally deep fried in oil and served immediately. If such French fried potatoes are frozen and then reheated, either in an oven or microwave, the desired taste and texture of the resulting product is not obtained. Even the use of suscepters in the microwave to direct thermal effects has failed to satisfactorily produce a product having the taste and texture of the conventional deep-fried French fried potato.

SUMMARY OF THE INVENTION

An object of the present invention is to produce reheatable French fried potatoes having the taste and texture of conventional deep-fried French fried potatoes.

Another object of the present invention is to produce microwave reheatable French fried potatoes having the taste and texture of deep-fried French fried potatoes.

Another object of the present invention is to produce reheatable French fried potatoes that may be frozen for storage for an indefinite period of time prior to reheating.

Another object of the present invention is to produce reheatable French Fried potatoes that are microwavable without the use of suscepters to direct thermal effects.

The process includes the following steps:
1) cleaning, peeling, slicing, and sizing the potatoes; then
2) blanching the potatoes; then
3) deep frying the potatoes in oil to at least partially cook the potatoes; then
4) applying a hydrocolloid film to the potatoes; then
5) optionally at least partially drying the potatoes to permit the hydrocolloid film to set; then
6) deep frying the potatoes in oil to further set the hydrocolloid film and to further partially cook the potatoes; then
7) freezing the potatoes; and then
8) reheating the potatoes in a microwave.

A feature of the present invention is the application of a hydrocolloid coat to the potatoes. Preferably the hydrocolloid is a cellulose derivative, such as cellulose ethers. The preferred cellulose derivative is methylcellulose.

Another feature of the present invention is the interruption of the deep-frying step of the potatoes to apply the hydrocolloid coat to the potatoes.

An advantage of the present invention is the production of reheatable French fried potatoes that have the texture and taste of conventional deep-fried French fried potatoes.

Another advantage of the present invention is the production of microwavable reheatable French fried potatoes that have the texture and taste of conventional deep-fried French fried potatoes.

Another advantage of the present process is that it is simple.

Another advantage of the present process is that the resulting product may be frozen for storage for an indefinite period of time.

Another advantage of the present process is that the resulting product is microwavable to produce a French fried potato having a desirable taste and texture without the use of suscepters in the microwave.

DETAILED DESCRIPTION OF THE PREFERRED EMBODIMENTS

Figure 1:
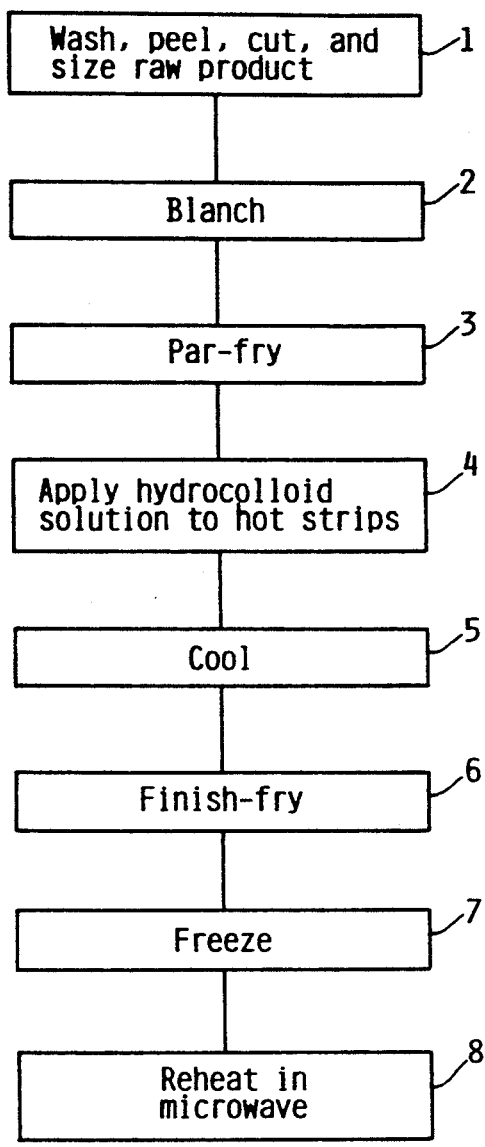
FIG. 1 illustrates a flow chart identifying the steps of the present process.

The steps of the present process are indicated in general by respective reference numerals 1-8 in FIG. 1.

STEP 1: RAW PRODUCT

The tubers utilized in the examples which follow were Russet Burbank potatoes, with typically a solids level of about 18%. Other potato varieties or starchy vegetables such as sweet potatoes, yams, peas, and corn may also be processed according to the following steps as appropriate.

The tubers are initially sorted and placed in water to remove excess surface debris. A water-flushed abrasion peeler or any other suitable peeling method is used to peel the tubers. Defective areas are trimmed. Subsequently, French fry pieces are sized by cutting axial strips of about ¼" by ¼" from the tubers. Other cutting dimensions may be used and the dimension of the pieces may impact principally on the total par-frying time.

It should be noted that, although preferred, the step of peeling the tubers is optional. A hydrocolloid film may be formed about a tuber strip which is cut from an outer portion of the tuber to retain a strip of tuber skin. The film may also be referred to as a shell or coat.

STEP 2: BLANCHING

The step of blanching the tuber strips refers to heating the tuber strips in an aqueous medium, such as water or steam, to control the sugar content of the tuber strips, which in turn controls the color of the final microwaved product. A longer heat treatment draws more sugar out of the potato tissue to produce a brown French fry of a lighter shade. A shorter heat treatment draws out less sugar to lend a darker brown color to the French fry. This heat treatment also softens or tenderizes the potato tissue and gelatinizes the starch on the outside of the tuber strips to provide a crust to the strips, which may retard oil absorption.

This moderate heat treatment to blanch the tuber strips is preferably carried out in an aqueous medium at 140° F. to 212° F. More preferably, the thermal treatment in this step is equivalent to exposure at 212° F. for 4 to 5 minutes for tuber strips of ¼" by ¼". The tuber strips are then promptly removed and allowed to cool in cold water.

It should be noted that the tuber strips may be blanched at temperatures between about 140° and 212° F. The time for such blanching may vary between 4 and 40 minutes. If desired, the tuber strips may be steamed to be blanched.

It should be further noted that after this step of blanching, and prior to the subsequent step of partially frying the strips, the strips may be replenished with sugar if it is desired to darken the strips. This replenishment is accomplished by immersing the strips in a dilute (up to about 1%) glucose solution for up to about 20 minutes.

STEP 3: PAR-FRYING

The blanched tuber strips are then deep fried in oil to be partially cooked. Accordingly, this is referred to as a par-fry step. The temperature of the oil and the residence time of the strips in the oil may be varied to further control the color of the final microwavable product. This par-fry step also promotes crust formation to provide a matrix for adhesion of the hydrocolloid film. In addition, this par-fry step helps achieve a proper degree of doneness to the partially-cooked potatoes.

Preferably, the tuber strips are deep fried in vegetable oil at about 385° F. to about 400° F. for about 2 minutes. The strips are then removed from the vegetable oil and slightly agitated to remove excess oil.

It should be noted that the residence time of the tuber strips in the oil may fall in a range from about ½ to about 4 minutes, and that the temperature of the oil may fall in a range from about 300° to about 400° F. These parameters may be dependent on the load of material to be processed and whether processing is batch or continuous.

STEP 4: HYDROCOLLOID APPLICATION

Immediately after removal from the fryer, the hot strips are coated with a room temperature hydrocolloid solution, preferably a cellulose derivative such as methylcellulose. The hydrocolloid solution is preferably applied uniformly. This can be accomplished by spraying or dipping the hydrocolloid onto the tuber strips. Care must be taken to prevent agglomeration of the hydrocolloid-coated tuber strips.

The preferred hydrocolloid, methylcellulose, is obtainable in a powdered form from Dow Chemical Co., under the trademark "METHOCEL." A 1% weight per volume solution to pour onto the hot tuber strips may be prepared as follows:

a) approximately ½ the desired volume of water is heated to approximately 190° F.;
b) under constant and vigorous agitation, the methylcellulose powder is slowly added to the water to ensure complete hydration of the particles and prevent agglomeration; it is desired that the suspension appear semi-cloudy and free of dry, unwetted powder;
c) after removal from the heat, the remaining ½ volume of cold water is then immediately added to the stirring suspension in a slow continuous steam;
d) the solution is then quickly transferred to an ice bath with continued stirring; the solution then becomes clear and viscous as it cools;
e) either use immediately or store under refrigeration prior to application onto the tuber strips.

It should be noted that the concentration of the hydrocolloid in solution may be used in a range from about 0.5% weight per volume to about 4% weight per volume. It is important to maintain the viscosity of the hydrocolloid solution in a range that allows the application of a sufficient and uniform coating.

It should further be noted that, instead of pouring the hydrocolloid solution over the tuber strips, the tuber strips may be dipped into the hydrocolloid solution or the hydrocolloid solution may be sprayed onto the tuber strips.

It should be further noted that it is believed that the hydrocolloid coating so applied to the strips provides a film on the exterior or crust of the blanched and par-fried potato strips. Such a film of hydrocolloid may retard the absorption of oil. Generally, the application of the hydrocolloid coat immediately after par-frying and before subsequent finish-frying is relatively critical to providing a product with the taste and texture of a conventional French fry when reheated by microwave energy. It is also relatively critical that the application of the hydrocolloid be sequenced between the par-frying and finish-frying steps (3 and 6). This sequence helps ensure proper adhesion of the hydrocolloid film, proper color development of the French fries and a proper degree of doneness of the potatoes such that reheating by microwave energy is sufficient to make the product ready for consumption.

It should be noted that the following hydrocolloids may be used to coat the tuber strips:
a) cellulose derivatives;
b) starch;
c) modified starch; and
d) gums.

It should further be noted that the following cellulose derivatives may be used:
a) methylcellulose;
b) hydroxy methylcellulose; and
c) mixtures thereof.

STEP 5: COOLING AND DRYING

After application of the hydrocolloid film, the strips are preferably uniformly dried either at room temperature or by the application of heat. The intent of this step is to remove the water that was added to the tuber strips as a result of hydrocolloid application.

Preferably, the strips are dried for about 10 minutes. Alternatively, the tuber strips may be dried in a hot oven for a shorter length of time. This partial setting of the film may be described as a partial dehydration of the hydrocolloid, or as a stabilization of the hydrocolloid to minimize disengaging of the hydrocolloid film from the potato strips during subsequent processing steps. This drying step may also permit the hydrocolloid to at least partially penetrate the tuber strips.

STEP 6: FINISH-FRYING

After being dried, or immediately after the hydrocolloid coat is applied, the tuber strips are deep fried in vegetable oil at preferably about 385° F. to about 400° F. for preferably about 1.5 minutes. This step is intended to fix and retain the hydrocolloid film onto the potato strips, and to promote the proper degree of color and doneness when the product is reheated by microwave energy. It is not critical as to the exact temperature and time of each of the two frying steps (3 and 6) as long as the combined effect of these steps is known to achieve the proper degree of doneness. Preferably, for the ¼" by ¼" strips, this combined effect is equivalent to 3½ minutes at 385° for the two frying steps. What is critical is that the traditional single step of frying of the tuber strips is interrupted for the application of the film coating of the hydrocolloid.

This step of again immersing the tuber strips in hot vegetable oil further fixes or sets or stabilizes the hydrocolloid or hydrocolloid film on the tuber strips to further aid in preserving the taste and texture of the tuber strips while the tuber strips are in frozen storage and during the relatively rapid heating in a microwave. The setting of the hydrocolloid, as facilitated by the finish-frying step, may involve a dehydration of the hydrocolloid.

While immersed in the oil in this step 6, the tuber strips may be agitated by any means suitable to prevent agglomeration of the strips and preserve the uniform hydrocolloid coat.

It should be noted that the residence time of the tuber strips in the oil during this step may fall in a range from about ½ to about 4 minutes at an oil temperature of about 300° F. to about 400°. Varying the residence time and temperature may also influence the color shade and degree of doneness of the final microwaved product.

STEP 7: FREEZING

Figure 2:
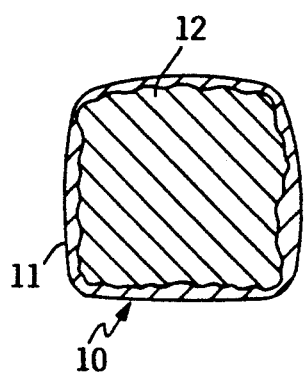
FIG. 2 is a section view of a French sliced potato processed according to the process of FIG. 1.

The finish-fried tuber strips are frozen, and kept frozen until reheated by microwave energy. As shown in FIG. 2, a finish-fried tuber strip 10 includes a hydrocolloid coat 11, such as a methylcellulose coat, enveloping the body 12 of the tuber strip. It should be noted that the coat 11 preferably surrounds the body 12 from end to end of the tuber strip.

STEP 8: MICROWAVE REHEATING

The frozen tuber strips are arranged, preferably in a single layer whether in or out of a package, and then heated by microwave energy equivalent to about 1 minute in a 700 watt oven set on high power. The time will vary based on the load and oven capability; the intent of microwave reheating is to bring the product to a temperature suitable for consumption. No suscepters are required. This heating step further cooks the tuber strips such that the tuber strips are completely cooked to reflect the taste and texture of conventional deep-fried French fried potatoes.

EXAMPLES

Example 1

Russet Burbank potatoes, solids level approximately 18%, were sorted and placed in tap water to remove excess surface debris. A water-flushed abrasion peeler was used to peel the potatoes. Defective areas were hand-trimmed and the tubers were submerged in tap water. Axial strips of ¼" by ¼" were cut from the tubers for blanching.

The raw potato strips were then immersed into slow boiling water. An initial drop in temperature was observed to approximately 200° F. The water returned to a slow boil during the blanch. After 4.5 minutes, the product was promptly removed and immediately rinsed with cold tap water, drained and allowed to cool at room temperature.

The blanched strips were then par-fried in vegetable oil in a batch fryer. The oil was at an initial temperature of 400° F., and fell to approximately 385° F. with the addition of approximately 400 grams of potato strips. Each sample was fried for 2 minutes with minimal mixing. The strips were removed and slightly agitated to remove excess oil.

Immediately after removal from the fryer, the strips were transferred to an aluminum basket sitting in a shallow tray. A room temperature 1% weight per volume methylcellulose solution, prepared as described above, was poured onto the hot strips. The basket was lightly agitated to ensure a complete and uniform film coating on the strips. Excess film and oil was allowed to drain and collect in the shallow tray. The coated strips were transferred to a grate. The strips were spread out in a single layer to eliminate agglomeration. Small and irregular pieces were manually sorted form the batch.

The strips were then allowed to sit at room temperature for approximately 10 minutes.

The coated strips were then placed in a frying basket. They were slowly immersed in approximately 400° F. oil which dropped to approximately 385° F. during the 1.5 minute finish-frying. The strips were agitated at the start of the frying to break up agglomerated clusters of strips. The basket was removed and slightly agitated to eliminate excess oil. The strips were then spread to drain on a tray lined with paper towels and allowed to slightly cool at room temperature before freezing.

The finished-fried strips were then first frozen on a tray at −40° F. to ensure rapid and uniform freezing. When frozen solid, after approximately 15 minutes, the strips were transferred to freezer storage bags. Prior to microwave heating, strips were tempered at 0° F. for 15 minutes.

Approximately 6-8 frozen fries were subsequently arranged on a paper plate. They were heated in a 700 watt microwave oven on high power for 1 minute prior to consumption. The taste and texture of the fries were desirable and rivaled the quality of freshly prepared French fries.

Example 2

1. STARTING PRODUCT

Frozen commercial shoestring cut potatoes are an acceptable starting product. A typical processing history may include: sorted and graded Russet tubers were peeled, washed, trimmed and cut axially into shoestring strips (¼" by ¼"). The potato strips were blanched at 158–170° F. for 15–20 minutes and oven dried at 150–158° F. for 6–7 minutes. The dried strips were then par-fried for 45 seconds to 2.5 minutes at 375–385° F. The par-fried potatoes were cooled and frozen at −30° F., inspected and packaged in 5 pound bags for shipping.

2. PROCESSING

Figure 3:
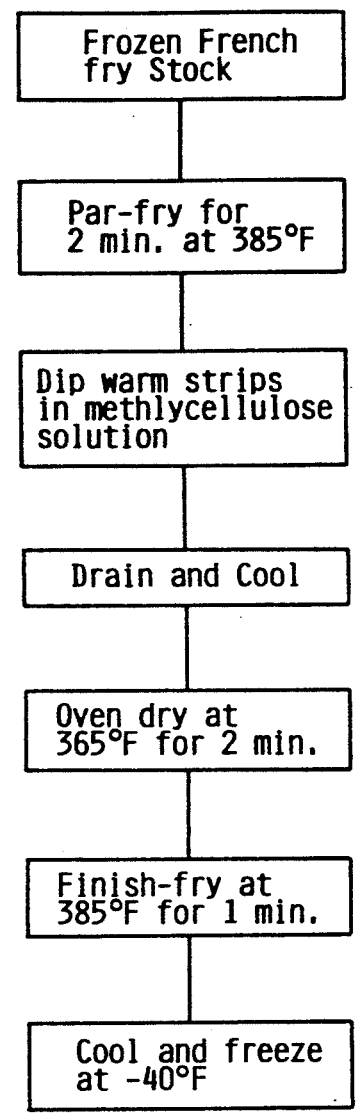
FIG. 3 illustrates a flow chart showing an alternate process.

FIG. 3 outlines the preparation process for methylcellulose coated French fries when using a commercial frozen product as the starting material.

a. First Fry

An initial load of approximately 320 grams of frozen strips were fried in vegetable oil at 385° F. for 2 minutes with occasional mixing to ensure uniform cooking. After frying, excess oil was removed by agitating the basket and the product was allowed to drain.

b. Methylcellulose Application

Warm potato strips were individually dipped in the methylcellulose solution prepared as described above. It was important to thoroughly coat each strip with the slightly viscous solution.

C. Drain and Cool

The dipped strips were then set on a metal grate to allow excess film to drain off. The strips also were allowed to slightly cool during the dipping and draining procedures.

d. Oven Drying

The coated potato strips were placed on a grate in a convection oven set at 365° F. for 2 minutes.

e. Finish Frying

After oven drying, the strips were finish-fried at 385° F. for 1 minute. The French fries were removed from the fryer and agitated to eliminate excess oil and allowed to cool before freezing.

f. Frozen Storage

The potato strips were rapidly frozen in a blast freezer at −40 F. The strips were then placed in freezer storage bags until microwave reheating. Prior to microwave heating, the strips were tempered at 0° F. for 15 minutes.

Example 3

STARCH AS A HYDROCOLLOID FILM

A 1% modified high amylose corn starch (w/v) solution was prepared by heating water to 205° F. and adding the starch powder with continuous stirring. The suspension was heated and stirred for approximately 30 minutes to disperse the powder. The solution was semi-cloudy and slightly viscous. The application of the film and all other processing steps for the potato strips was as outlined in Example 2.

Example 4

THE ADDITION OF OIL TO SIMULATE A FRYING EFFECT

Oil, specifically vegetable oil, can be added to the hydrocolloid solution. The volume of oil, 10% (w/v), should be added, with agitation, to the hydrocolloid solution following the addition of water. The application of the film and all other processing steps for the potato strips was as outlined in example 2. This variation in film composition can be incorporated into the processes outlined in Examples 1, 2, and 3. The addition of oil may simulate a "frying" effect during microwave reheating.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A process for preparing French sliced tubers for microwave heating, comprising:
   a) cleaning and sizing the tubers; then
   b) blanching the tubers; then
   c) at least partially frying the tubers in oil to at least partially cook the tubers; then
   d) coating the tubers with a solution of a cellulose derivative to form a distinct exterior film thereon; then
   e) optionally at least partially drying the tubers to permit the cellulose derivative to at least partially set on the tubers; and then
   f) frying the tubers in oil to further set the cellulose derivative whereby the tubers may be frozen for storage and subsequently heated in a microwave.

2. The process of claim 1, wherein the cellulose derivative comprises methylcellulose.

3. The process of claim 2, wherein the methylcellulose comprises a methylcellulose solution having methylcellulose in a range of about 0.5% to about 4% weight per volume.

4. The process of claim 3, wherein the methylcellulose in the solution comprises about 1.0% weight per volume.

5. The process of claim 1, wherein the step of at least partially frying the tubers in oil is immediately followed by the step of coating the tubers with the cellulose derivative such that the tubers are coated while hot.

6. The process of claim 1, wherein the step of coating the tubers includes coating the tubers with an oil mixed in with the cellulose derivative.

7. The process of claim 1, wherein the step of blanching the tubers comprises the step of heating the tubers in an aqueous medium.

8. A deep-fry process for preparing blanched French sliced tubers for microwave heating, comprising:
   a) deep frying the tubers in oil to at least partially cook the tubers; then
   b) removing the tubers from the oil; then
   c) applying a solution of a cellulose derivative coating to the tubers and; to form a distinct exterior film thereon; then
   d) deep frying the tubers in oil to at least partially set the cellulose derivative coating whereby the tubers may subsequently be microwaved.

9. The deep-frying process of claim 8, wherein the cellulose derivative comprises methylcellulose.

10. A deep-fry process for preparing blanched French sliced tubers for microwave heating, the deep-fry process including the step of deep frying the tubers, comprising
    interrupting the step of deep frying the tubers to apply a solution of a cellulose derivative coating to the tubers to form a distinct exterior film thereon such that the tubers are deep fried substantially immediately before and after the cellulose derivative coating is applied and such that the tubers may be stored for subsequent microwave heating.

11. The deep-fry process of claim 10, wherein the cellulose derivative comprises methylcellulose.

12. A process for preparing tubers for microwave heating without suscepters, comprising:
    a) cleaning and sizing the tubers; then
    b) heating the tubers in an aqueous medium to soften the tubers, to gelatinize the starch on the outside of the tubers, to provide a crust to on the tubers, and to draw sugars out of the tubers to control the color of the tubers; then
    c) frying the tubers in oil to at least partially cook the tubers; then
    d) applying a solution of a methylcellulose coating to the tubers to form a distinct exterior film thereon; then
    f) frying the tubers in oil to further set the methylcellulose coating such that the tubers may be frozen and subsequently reheated in a microwave without suscepters.

* * * * *

UNITED STATES PATENT AND TRADEMARK OFFICE
CERTIFICATE OF CORRECTION

PATENT NO.   :   5,242,699
DATED        :   September 7, 1993
INVENTOR(S)  :   Rebecca Bednar, et al It is certified that error appears in the above-identified patent and that said Letters Patent is hereby corrected as shown below:

In claim 9, column 8, line 26, delete "and;"; line 27, after "thereon;" insert -- and --.

In claim 12, column 8, line 51, delete "to" (second occurrence); line 59, insert -- e) permitting the tubers to at least partially dry to permit the methylcellulose coating to at least partially set; and then --.

Signed and Sealed this

Seventeenth Day of May, 1994

Attest:

BRUCE LEHMAN

Attesting Officer   Commissioner of Patents and Trademarks